Patented Oct. 20, 1936

2,057,679

UNITED STATES PATENT OFFICE 2,057,679

COLORED ROOFING GRANULE AND METHOD OF MANUFACTURING THE SAME

Henry R. Gundlach, Baltimore, Md., assignor to Central Commercial Company, a corporation of Illinois No Drawing. Application October 3, 1935,
Serial No. 43,387

10 Claims. (Cl. 91—70)

This invention relates to composition roofing and, more particularly, to colored granules for use on composition roofing and to the process of attaching the color pigment to the surface of the granule.

One of the objects of the invention is the provision of new and improved colored granules for use on composition roofing.

Another object of the invention is the provision of a new and improved process for attaching color pigment to the surface of granules and other building material.

A further object of the invention is the provision of new and improved roofing granules having color material permanently attached to the surface thereof; granules that may be prepared at a minimum of time and expense; that may have various shades and tints as may be desired, and that will retain the brilliancy of their color under varying climatic conditions.

It is common practice in the manufacture of composition roofing to employ a foundation felt impregnated with a bituminous composition, cover the same with a coat of asphaltic compound of relatively high melting point, or the like, and partially embed in the surface of the outer coating while the same is plastic a coat of granules of some natural color or of granules artificially colored. The former are often unsatisfactory because of the lack of brilliancy and permanency in the colors which are available for commercial use. It has been proposed to color granules by attaching colored pigments to the surface of the granules by a binder of water glass or the like. This type of granule, for the most part, has also been unsatisfactory because the binder is more or less affected by the mechanical action of the wind and rain, and being more or less soluble the color pigment in time is released and is blown off by the wind or washed away by rain or water.

The present invention seeks to remedy these defects by the provision of a binder for attaching color pigment to the surface of granules which is insoluble and which is highly weather resistant.

It has also been proposed to fuse the binder onto the granules but the heat required to fuse certain binder materials is such as to materially affect the luster of certain pigments and is such as to prohibit the use altogether of certain other pigments.

In the present invention, a moderate amount of heat is employed but not sufficiently high to injuriously affect the color pigments employed.

The granules to be colored are reduced and screened to the proper size in the usual manner. They may be made from any suitable material, such as slate, quartz, shale, traprock, and the like.

The cement employed is preferably in the form of a powdered material which with the addition of phosphoric acid accompanied by a moderate amount of heat will form a cement for securing the color pigment firmly to the surface of the granules.

The powdered material may be made from compounds of any of the common elements of family A of Group II of the Periodic Classification of the elements—that is, the alkaline earth metals, barium, strontium and calcium. The compounds of these metals most suitable are the oxides, hydroxides or carbonates thereof.

Sufficient water is included to form a pasty material of suitable working consistency and the mass thoroughly mixed in any suitable manner, as in a mixing machine. It is desired that the consistency of the cement be such that a thin coat is formed on the granule for retaining the color pigment thereon.

The solid material for the cement is reduced to powder form in any suitable manner, as in a ball mill—and it is then ready for use. In coloring the granules, the powdered material, color pigment and granules may all be mixed together, or the color pigment and powdered material is first mixed together in dry form and then mixed with the granules. The granules are preferably first moistened, after which the mass of powdered material and color pigment are mixed with the granules. After the mass is thoroughly mixed, an aqueous solution of phosphoric acid is applied and the whole mass dried by heating to a temperature above 400° F. and below 800° F., preferably between 450° F. and 600° F., and simultaneously agitated to prevent agglomeration.

The following formula of material for coloring each ton of granules green gives satisfactory results and is here given by way of example only:

|   | Pounds |
|---|---|
| Phosphoric acid 75% | 40 |
| Oxide of one of the metals named herein in sufficient quantity to react on substantially all the phosphoric acid, as, for instance, if calcium oxide (CaO) is used, about | 15 to 25 |
| Chrome oxide (green color pigment) about | 18 |

In order to obtain the best results, it is necessary to apply heat to the mass after the cement has been applied to the granules. This may be done in a rotary kiln which will also agitate the mass to prevent agglomerations.

It is understood that the examples herein given are by way of example only and that the claims are not to be limited except by the prior art.

I claim as my invention:

1. A colored granule for use on composition roofing comprising a core of mineral matter having color pigment cemented on the surface thereof by a phosphate of one of the alkaline earth metals.

2. A colored granule for use on composition roofing having color pigment attached to the surface thereof by a binder comprising calcium phosphate.

3. A colored granule for use on composition roofing having color pigment attached to the surface thereof by a binder consisting of barium phosphate.

4. A colored granule for use on composition roofing having color pigment attached to the surface thereof by a binder consisting of strontium phosphate.

5. A method of coloring granules suitable for use on composition roofing which comprises mixing with said granules color pigment, a composition of cementitious material comprising a compound of the alkaline earth metals capable of reacting on phosphoric acid, a quantity of phosphoric acid and water.

6. A method of coloring granules suitable for use on composition roofing, comprising mixing with a quantity of granules, color pigment and an oxide of an alkaline earth metal and then mixing with the mass phosphoric acid and water, then heating the mass between 450° F. and 600° F. and simultaneously agitating the mass to prevent agglomeration.

7. A method of coloring granules suitable for composition roofing comprising mixing with the granules, color pigment, a carbonate of an alkaline earth metal, phosphoric acid and water, drying the mass at a temperature above 450° F., but below 650° F.

8. A method of coloring granules suitable for composition roofing comprising mixing with the granules, color pigment, a hydroxide of an alkaline earth metal, phosphoric acid and water, drying the mass at a temperature above 450° F. but below 650° F.

9. A method of coloring granules suitable for use on composition roofing which comprises mixing with the granules, color pigment, a compound of an alkaline earth metal that will react with phosphoric acid to form an insoluble phosphate, phosphoric acid and water to form a thin coat of said phosphate and color pigment, and then drying the mass at a temperature above 400° F., but below the point where the heat will injuriously affect either the granule or the pigment.

10. Composition roofing comprising a foundation felt impregnated with a bituminous composition, and colored granules secured to one face of said felt, each of said granules comprising a core of mineral matter, and color pigment secured to the surface thereof by a binder comprising the reaction products of phosphoric acid, in the presence of heat between 450° F. and 650° F., and a compound of one of the alkaline earth metals.

HENRY R. GUNDLACH.